United States Patent
Beuterbaugh et al.

(10) Patent No.: US 10,633,580 B2
(45) Date of Patent: Apr. 28, 2020

(54) DISTRIBUTING AN AMORPHIC DEGRADABLE POLYMER IN WELLBORE OPERATIONS

(71) Applicant: Halliburton Energy Services, Inc., Houston, TX (US)

(72) Inventors: Aaron M Beuterbaugh, Spring, TX (US); Michael W. Sanders, Houston, TX (US); Ubong Inyang, Humble, TX (US); Tyler Austen Anderson, Huffman, TX (US); Enrique Antonio Reyes, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/335,147

(22) PCT Filed: Oct. 10, 2016

(86) PCT No.: PCT/US2016/056229
§ 371 (c)(1),
(2) Date: Mar. 20, 2019

(87) PCT Pub. No.: WO2018/070976
PCT Pub. Date: Apr. 19, 2018

(65) Prior Publication Data
US 2019/0276732 A1 Sep. 12, 2019

(51) Int. Cl.
*C09K 8/88* (2006.01)
*C09K 8/70* (2006.01)
(Continued)

(52) U.S. Cl.
CPC .............. *C09K 8/885* (2013.01); *C09K 8/536* (2013.01); *C09K 8/68* (2013.01); *C09K 8/70* (2013.01);
(Continued)

(58) Field of Classification Search
CPC ...... C09K 8/885; C09K 8/92; C09K 2208/26; C09K 8/50; C09K 8/528; C09K 8/536; C09K 8/68; C09K 8/70; C09K 8/706; C09K 8/725; C09K 8/74; C09K 8/805; E21B 37/06; E21B 43/267
See application file for complete search history.

(56) References Cited

U.S. PATENT DOCUMENTS

| 7,021,379 B2 | 4/2006 | Nguyen |
| 7,036,587 B2 | 5/2006 | Munoz, Jr. et al. |
| (Continued) | | |

FOREIGN PATENT DOCUMENTS

| WO | 2010146493 A1 | 12/2010 |
| WO | 2016010539 A1 | 1/2016 |

OTHER PUBLICATIONS

Gomaa et al., "Experimental Investigation of Particulate Diverter Used to Enhance Fracture Complexity" Society of Petroleum Engineers; SPE-178983-MS (Feb. 24, 2016)18 pages.
(Continued)

*Primary Examiner* — Zakiya W Bates
(74) *Attorney, Agent, or Firm* — McGuireWoods, LLP

(57) ABSTRACT

Methods and systems for treating a fracture. An example method comprises providing a treatment fluid comprising a solubilized polyester and a water-miscible solvent; dispersing the treatment fluid into an aqueous fluid; wherein the dispersing the treatment fluid into an aqueous fluid precipitates the solubilized polyester and forms an amorphous polymeric structure comprising the solid polyester; introducing the amorphous polymeric structure into a fracture within a subterranean formation; and allowing the amorphous polymeric structure to degrade.

20 Claims, 6 Drawing Sheets

(51) Int. Cl.
*C09K 8/80* (2006.01)
*E21B 43/267* (2006.01)
*E21B 37/06* (2006.01)
*C09K 8/536* (2006.01)
*C09K 8/72* (2006.01)
*C09K 8/92* (2006.01)
*C09K 8/74* (2006.01)
*C09K 8/68* (2006.01)
*C09K 8/50* (2006.01)
*C09K 8/528* (2006.01)

(52) U.S. Cl.
CPC .............. *C09K 8/706* (2013.01); *C09K 8/725* (2013.01); *C09K 8/74* (2013.01); *C09K 8/805* (2013.01); *C09K 8/92* (2013.01); *E21B 43/267* (2013.01); *C09K 8/50* (2013.01); *C09K 8/528* (2013.01); *C09K 2208/26* (2013.01); *E21B 37/06* (2013.01)

(56) References Cited

U.S. PATENT DOCUMENTS

| | | |
|---|---|---|
| 8,016,040 B2 | 9/2011 | Ali et al. |
| 8,697,612 B2 | 4/2014 | Todd et al. |
| 8,985,213 B2 | 3/2015 | Saini et al. |
| 2003/0217866 A1 | 11/2003 | Deboer |
| 2005/0167105 A1 | 8/2005 | Roddy et al. |
| 2006/0283591 A1 | 12/2006 | Willberg et al. |
| 2008/0108524 A1 | 5/2008 | Willberg et al. |
| 2013/0269936 A1 | 10/2013 | Reyes et al. |
| 2015/0292301 A1 | 10/2015 | Minassa et al. |
| 2016/0032175 A1 | 2/2016 | Norman et al. |

OTHER PUBLICATIONS

Gomaa et al., "Improving Fracture Conductivity by Developing and Optimizing Channels within the Fracture Geometry: CFD Study" Society of Petroleum Engineers; SPE-178982-MS (Feb. 24, 2016) 25 pages.

Sierra, "Pressure-Dependent Induced Fracture Complexity or Natural Fracture Contribution Evaluation in Unconventional Reservoirs: How to Assure Their Long-Term Benefit" Society of Petroleum Engineers; SPE 178997-MS (Feb. 24, 2016) 29 pages.

Gomaa et al., "Engineering Solid Particulate Diverter to Control Fracture Complexity: Experimental Study" Society of Petroleum Engineers; SPE 179144-MS (Feb. 1, 2016) 19 pages.

International Search Report and Written Opinion for corresponding International Application No. PCT/US2016/056229 dated Jul. 10, 2017. (13 pages).

DISTRIBUTING AN AMORPHIC DEGRADABLE POLYMER IN WELLBORE OPERATIONS

TECHNICAL FIELD

The present disclosure relates to the distribution of a polymer into a wellbore penetrating a subterranean formation and more particularly to various systems and methods to distribute a solubilized polyester into various points of the wellbore for introduction into a fracture within the subterranean formation.

BACKGROUND

Stimulation techniques may be used to increase the recovery rate of hydrocarbons obtained from a subterranean formation. For example, some unconventional subterranean formations may be fractured to improve well productivity by placing or enhancing fractures running from the wellbore into the surrounding subterranean formation. These fractures may allow the hydrocarbons within the subterranean formation to flow more freely out of the subterranean formation through the creation of these additional flowpaths. Acidizing operations may be performed to improve productivity by using acid to dissolve material or pieces of the formation which restricts flow, or alternatively, to open or enhance new or existing flow paths in the fracture.

A variety of solid particulates may be used when performing these stimulation techniques. For example, diverting agents, proppant, microparticulates, solid acids, and chelants may all be used when stimulating a subterranean formation. Typically, the dispersal of these solid particulates may be performed by introducing an aqueous carrier fluid with the solid particulate into the desired fracture at a high pressure and/or rate. However, some of the solid particulates may not reach the desired area of the subterranean formation and may remain in the aqueous carrier fluid or settle out of the aqueous carrier fluid prematurely. Moreover, some of the solid particulates that do enter the fracture may undesirably flow back into the wellbore and not stay in the fracture as desired.

Dispersal of these solid particulates is an operation that may have very little operator control. Generally, a large amount of solid particulates are pumped into the fracture with the goal that enough of them will disperse evenly in the fracture to complete the desired operation. Problems may occur if too little of the solid particulates reach the desired area. For example, if too little proppant is placed in the fracture, the portions of the fracture without proppant may close and thereby lose conductivity. If this event occurs, said portion of the subterranean formation may need to be refractured. Refracturing may be expensive and time consuming. In other examples, acidizing may be used to enhance the flowpaths through a fracture. If not enough of the solid acid particulates reach the fracture, the formation walls of the fracture will not be adequately degraded, and the recovery rates may not be improved. If an insufficient amount of diverting agent is placed, uniform injection over a subject area may not be achieved, and the subsequent stimulation operation may be less successful.

BRIEF DESCRIPTION OF THE DRAWINGS

Illustrative examples of the present disclosure are described in detail below with reference to the attached drawing figures, which are incorporated by reference herein, and wherein.

Figure 1:
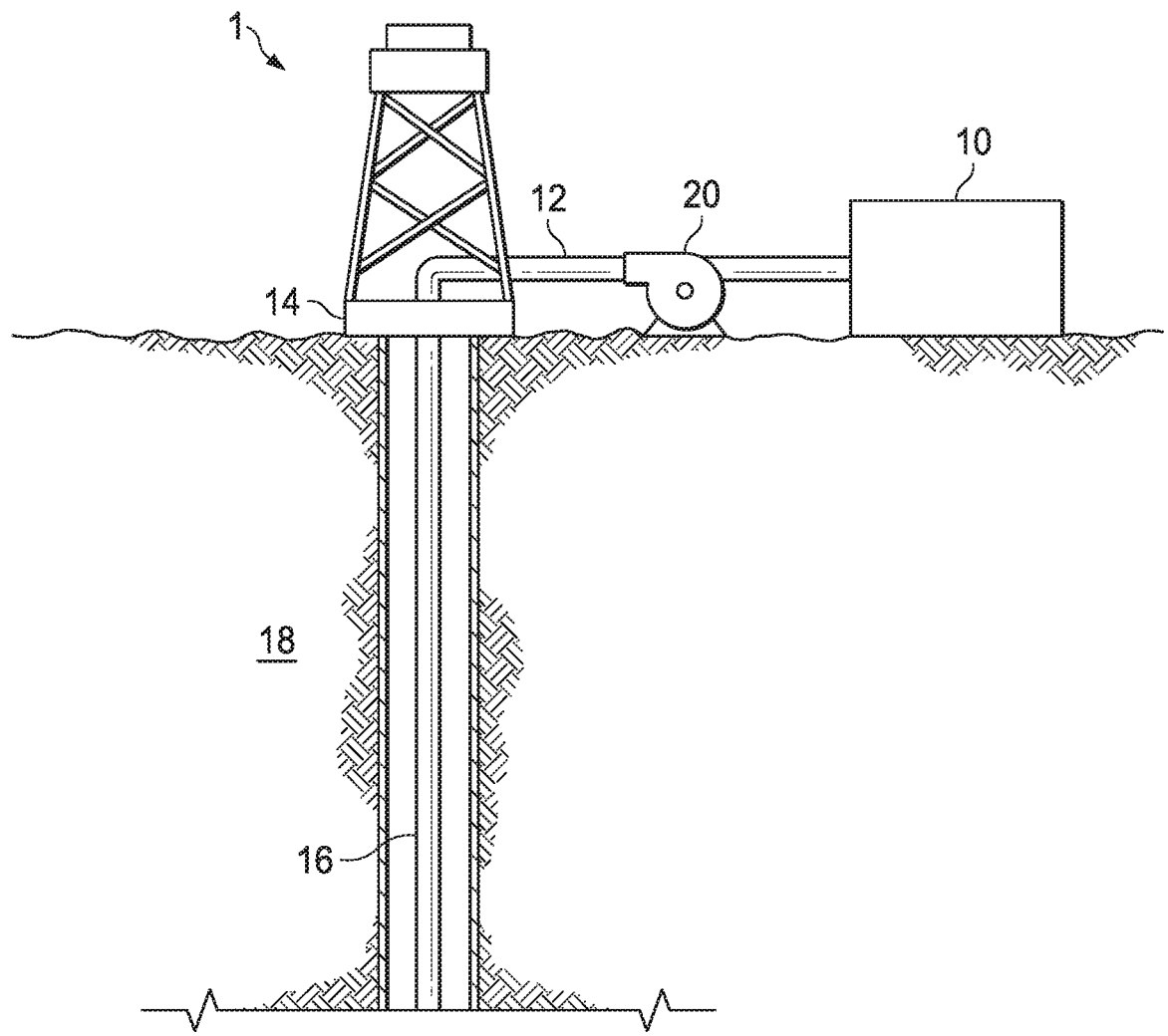
FIG. 1 illustrates a schematic of a system to deliver the treatment fluid to a downhole location, according to one or more examples.

The illustrated figures are only exemplary and are not intended to assert or imply any limitation with regard to the environment, architecture, design, or process in which different examples may be implemented.

DETAILED DESCRIPTION

The present disclosure relates to the distribution of a polymer into a wellbore penetrating a subterranean formation and more particularly to various systems and methods to distribute a solubilized polyester into various points of the wellbore for introduction into a fracture within the subterranean formation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein comprise the distribution of water-insoluble degradable polyesters in a treatment fluid. In some examples, the treatment fluid may also comprise solid particulates. The polyester is solubilized with a solvent and then precipitated by contact with an aqueous fluid. When precipitated, the polyester forms an amorphous polymeric "structure" which may "capture" the solid particulates as it precipitates, forming aggregates in some examples, which may then be injected into the fracture. "Structure," as used herein, generally refers to any configuration or shape of the precipitated polyester sufficient for carrying the solid particulates present within the treatment fluid. The structure is amorphous and is not limited to any specific or defined shape, and may comprise a variety of shapes. The size and shape of the "structure" is a factor of the concentration and volume of the solubilized polyester when precipitated. "Capture," as used herein, refers to the entrapment of the solid particulates by the polyester as it is precipitated out of solution. As the amorphous polymeric structure flows into the fracture, it may remain in the fracture, while the injection pressure is reduced. The solid particulate aggregates captured by the amorphous polymeric structure may also remain in the fracture, and the risk of solid particulate flow back may be reduced. Further, the amorphous polymeric structure may be able to capture the solid particulates as the solubilized polyester is precipitated out of solution. The ability of the amorphous polymeric structure to capture and carry the solid particulates may increase the amount of solid particulates injected and distributed into the fracture. As such, the use of the treatment fluid comprising the solubilized polyester may allow for less solid particulates to be pumped with the treatment fluid. This may result in a reduction in operational expenditures.

The amorphous polymeric structure may also be used to form discretized solid particulate aggregates prior to injection into a fracture. This may be beneficial in propping operations as the proppant may already be formed into sizable aggregates prior to closure of the fracture by the formation pressure. The polyester used to produce the amorphous polymeric structure may degrade over time in the fracture. Because the amorphous polymeric structure captures proppant as discrete aggregates prior to injection into the fracture, aggregates of the proppant may already be present and randomly dispersed in the fracture allowing for less reliance upon the fracture pressure to aggregate the proppant. As such, flowpaths around the proppant aggregates may have increased permeability.

Examples of the methods and systems described herein may be used to distribute the solid particulates in the treatment fluid to a desired fracture. The solid particulates may be carried into the fracture within the amorphous polymeric structure, and the amorphous polymeric structure may be formed when desired without premature precipitation. The amorphous polymeric structure may also be formed into various generalized structures of varying size. For example, the amorphous polymeric structure may be precipitated to form rope-like structures, globular webbing-like structures, thin sheet-like structures, and the like. The size and shape of the amorphous polymeric structure may be adjusted to provide control over the capture of the solid particulates, the size of the aggregates formed, and the areas in which the amorphous polymeric structure may be able to flow and carry the solid particulates.

Examples of the treatment fluids described herein comprise a water-insoluble degradable polyester. The polyester should be water-insoluble such that it remains solid in an aqueous fluid and does not dissolve. As such, exposure of the solubilized polyester to an aqueous fluid will drive the polyester out of solution. The precipitated polyester may be degradable, and the precipitated polyester may degrade over time under wellbore conditions. Degradation mechanisms may include, but should be limited to, hydrolysis, erosion, chemical degradation, biodegradation, and the like. Suitable polyesters may include, but are not limited to, poly(lactide), poly(glycolide), poly(e-caprolactone), poly(hydroxybutyrate), poly(orthoester), poly(terphalates) any copolymer thereof, any derivative thereof, or any combination thereof. The polyesters may be aliphatic or aromatic. The polyesters may be dissolved in a water-miscible solvent, and then this solution may be introduced to the aqueous fluid to precipitate the polyester as desired. The concentration of the polyester in the water-miscible solvent may be any concentration up to the saturation point of the specific chosen solvent. As such, the concentration of the polyester is a function of the amount of said polyester that may be dissolved in a specific chosen solvent.

Examples of the treatment fluids described herein comprise a water-miscible solvent. As used herein, the term "water-miscible solvent" refers to a non-aqueous fluid that mixes by diffusion in some proportion with water at ambient or formation temperatures without the use of chemical additives, for example, mutual solvents (e.g., alcohol ethers and the like). The water-miscible solvent should be sufficient for dissolving the polyester and not merely suspending particles or particulates of the polyester. Generally, examples of water-miscible solvents may include, but are not limited to, nitriles, ketones, aldehydes, formamides, alkanes, halogenated alkanes, halogenated carboxylic acids, halogenated alcohols, aromatics, amines, cyclic amines, pyridines, pyrrolidones, ethers, cyclic ethers, esters, cyclic esters, furans, halogenated derivatives thereof, or any mixture thereof. Specific examples of such water-miscible solvents may include, but are not limited to, acetonitrile, dimethylformamide, methyl ethyl ketone, pyridine, N-methyl-2-pyrrolidone, dimethyl sulfoxide, butyrolactone, acetic acid, formic acid, ethyl acetate, acetone, glycol, glycerol, tetrahydrofuran, dioxane, dichloromethane, methanol, diethyl ether, benzene, toluene, trifluoroacetic acid, hexafluoro-2-propanol, dichloromethane, chloroform, carbon tetrachloride, pentane, hexane, heptane, octane, halogenated derivatives thereof, alkylated derivatives thereof, derivatives thereof, isomers thereof, or any mixture thereof.

In certain examples, the solubilized polyester may be contacted with an aqueous fluid at or near perforations in a casing, fractures, wormholes, or other permeable regions of a formation in order to form a solid polyester that may be used as a diverting agent to reduce or prevent the flow of another fluid (e.g., a fracturing fluid and/or acidizing fluid) into those regions of a formation and thereby divert the flow of that fluid to another portion (e.g., a less permeable portion) of the formation.

Examples of the treatment fluids described herein may comprise at least one type of solid particulate. Generally, examples of the solid particulates may include, but are not limited to, diverting agents, proppant, microparticulates, solid acids, breakers, scale inhibitors, and chelants. The solid particulates may be mixed with the solubilized polyester and the water-miscible solvent to form a treatment fluid. When desired for use the treatment fluid may be introduced into the wellbore. The polyester may be driven out of solution when the treatment fluid contacts an aqueous fluid. The solid polyester may then form an amorphous polymeric structure that may capture and carry the solid particulates to a desired location within the wellbore or the subterranean formation.

As described above, the solid polyester may function as a degradable diverting agent that may degrade via hydrolysis, chemical degradation, etc. In some of the disclosed examples, the treatment fluid may not comprise a solid particulate. In some alternative examples, some of the solid particulates described herein may function as diverting agents that may be used as additional diverting agents with the degradable solid polyester. These solid particulate diverting agents may be captured in the amorphous polymeric structure as the solubilized polyester precipitates. Examples of solid particulate diverting agents may include, but are not limited to, polylactides (polylactic acid), graded sand, silica dust, microparticulates (e.g., fly ash).

An example solid particulate may be a proppant. In some examples, the proppant may be particulate and of various sizes. In some examples, multi-modal particle size distributions of the proppant may be used in the treatment fluids. In some examples, multiple species of proppant may be used in the treatment fluids. The proppant may be used to prop open fractures and form proppant packs or proppant pillars within fractures. Suitable species of proppant include, but are not limited to, sand, natural sand, quartz sand, bauxite and other ore, ceramic materials, glass materials, particulate garnet, metal particulates, nylon pellets, polymer materials, polytetrafluoroethylene materials, nut shell pieces, seed shell pieces, fruit pit pieces, wood, or combinations thereof. Suitable proppant may also include composite particulates comprising a binder and a filler material wherein suitable filler materials include silica, alumina, fumed carbon, carbon black, graphite, mica, titanium dioxide, meta-silicate, calcium silicate, various clays and clay families (e.g., kaolin, illite, halloysite, nacrite, smectite, saponite, sepiolite montmorillonite, etc.), talc, zirconia, boron, slag, fly ash, hollow glass microspheres, solid glass, microparticulates, or combinations thereof. The concentration of the proppant in the treatment fluid may range from about 0.1 ppg to about 25 ppg of the treatment fluid. The concentration of the proppant in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the proppant in the treatment fluid may be about 0.1 ppg, about 1 ppg, about 5 ppg, about 10 ppg, about 15 ppg, about 20 ppg, or about 25 ppg. With the benefit of this disclosure, one of ordinary skill in the art will be able to select a proppant and prepare a treatment fluid comprising the proppant for a given application.

As discussed, the proppant may be variously sized. As used herein, the term "micro," when used to describe proppant, for example, "micro proppant," refers to proppant particulates having an average particle size distribution in the range of from about 0.01 micrometers (μm) to about 100 μm, encompassing any value and subset therebetween, such as, about 0.01 μm, about 0.1 μm, about 1 μm to about 20 μm, or about 20 μm to about 40 μm, or about 40 μm to about 60 μm, or about 60 μm to about 80 μm, or about 80 μm to about 100 μm. In some examples, the micro proppant has an average particle size distribution in the range of a lower limit of about 0.01 μm, about 0.1 μm, 1 μm, 5 μm, 10 μm, 15 μm, 20 μm, 25 μm, 30 μm, 35 μm, 40 μm, 45 μm, and 50 μm to an upper limit of about 100 μm, 95 μm, 90 μm, 85 μm, 80 μm, 75 μm, 70 μm, 65 μm, 60 μm, 55 μm, and 50 μm, encompassing any value and subset therebetween. As used herein, the term "medium," when used to describe proppant, for example, "medium proppant," refers to proppant particulates having an average particle size distribution in the range of from about 100 μm to about 200 μm, encompassing any value and subset therebetween, such as about 100 μm to about 120 μm, or about 120 μm to about 140 μm, or about 140 μm to about 160 μm, or about 160 μm to about 180 μm, or about 180 μm to about 200 μm. In some examples, the medium proppant has an average particle size distribution in the range of a lower limit of about 100 μm, 105 μm, 110 μm, 115 μm, 120 μm, 125 μm, 130 μm, 135 μm, 140 μm, 145 μm, and 150 μm to an upper limit of about 200 μm, 195 μm, 190 μm, 185 μm, 180 μm, 175 μm, 170 μm, 165 μm, 160 μm, 155 μm, and 150 μm, encompassing any value and subset therebetween. As used herein, the term "coarse," when used to describe proppant, for example, "coarse proppant," refers to proppant particulates having an average particle size distribution greater than about 200 μm, including size ranges comprising several millimeters. In some examples, the coarse proppant has an average particle size distribution in the range of a lower limit of about 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, and 950 μm to an upper limit of about 1 mm, 1.5 mm, 2 mm, 2.5 mm, 3 mm, 3.5 mm, 4 mm, 4.5 mm, 5 mm, and so on and also encompassing any value and subset therebetween. Each of these values is critical to the examples of the present disclosure and may depend on a number of factors including, but not limited to, the type of proppant selected, the type of subterranean formation being treated, the desired complex fracture geometry, and the like. While overlap in these size ranges may be possible, the selection of the sized proppant particulates may be dependent on a number of factors including, but not limited to, the material of the proppant, the shape of the proppant, the type of subterranean formation, the size of the dominate fracture, the presence of or desire to create a fracture network, and the like.

An example solid particulate may be a solid acid or a solid acid precursor. Illustrative examples of solid acids or solid acid precursors may include, but are not limited to, polylactic acid, polyvinylacetate, a polycaprolactone, a polyglycolide, a polyethylene adipate, a polyhydroxyalkanoate, a polyethylene terephthalate, a polybutylene terephthalate, a polytrimethylene terephthalate, a polyethylene naphthalate, benzoic acid, p-toluene sulfonic acid, a heteropolyacid, a sulfated metal oxide, metal acetates, metal formates, and any combination thereof.

In some examples, the solid particulate may comprise a chelating agent. The chelating agent may include one or more acids of the chelating agent, one or more salts of the chelating agent, one or more hydrates of the chelating agent, one or more esters of the chelating agent, derivatives thereof, or combinations thereof. Salts of the chelating agent may be, but are not limited to, monovalent, divalent, trivalent, tetravalent, or greater valences. Salts of the chelating agent can include one or more alkali metals (e.g., lithium, sodium potassium, or cesium), one or more alkaline earth metals (e.g., beryllium, magnesium, or calcium), one or more other metals, or any mixture thereof. In some examples, the salts of the chelating agent may be partially or completely soluble in water having a pH of about 3 or greater.

In some examples, the chelating agent may comprise one or more phosphonate chelating agents. Illustrative examples of phosphonate chelating agents may include, but are not limited to, N-(phosphonomethyl)iminodiacetic acid (PMIDA), aminomethylphosphonic acid (AMPA), vinylphosphonic acid, dimethyl methylphosphonate (DMMP), 1-hydroxyethylidene-1,1-diphosphonic acid (HEDP), aminotris (methylenephosphonic acid) (ATMP), ethylenediaminetetra (methylenephosphonic acid) (EDTMP), tetramethylenediaminetetra (methylenephosphonic acid) (TDTJVIP), hexamethylenediaminetetra (methylenephosphonic acid) (HDTMP), diethylenetriaminepenta (methylenephosphonic acid) (DTPMP), phosphonobutanetricarboxylic acid (PBTC), 2-carboxyethyl phosphonic acid (CEPA), 2-hydroxyphosphonocarboxylic acid (HPAA), aminotris (methylenephosphonic acid) (AMP), N,N-bis(phosphonomethyl)glycine (BPMG), a salt thereof, a hydrate thereof, an acid thereof, an ester thereof, a derivative thereof, or any combination thereof.

Other examples of chelating agents may include, but are not limited to, glutamic acid diacetic acid (GLDA), methylglycine diacetic acid (MGDA), f3-alanine diacetic acid (J3-ADA), ethylenediaminedisuccinic acid, S,S-ethylenediaminedisuccinic acid (EDDS), iminodisuccinic acid (IDS), hydroxyiminodisuccinic acid (RIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCAS), N-bis[2-(1,2-dicarboxyethoxyl) ethyl]methylglycine (NICBAS), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, a polymer thereof, a salt thereof, a hydrate thereof, an acid thereof, an ester thereof, a derivative thereof, or any combination thereof.

An example solid particulate is a scale inhibitor. Illustrative examples of scale inhibitors include, but are not limited to, bis(hexamethylene triamine penta(methylene phosphonic acid)), diethylene triamine penta(methylene phosphonic acid), ethylene diamine tetra(methylene phosphonic acid), hexamethylenediamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), a methylene phosphonate, a phosphonic acid, an aminoalkylene phosphonic acid, an aminoalkyi phosphonic acid, a polyphosphate, a salt thereof, a combination thereof, and a derivative thereof.

In some examples, the treatment fluid may further comprise one or more breakers to, among other reasons; increase the rate of degradation of the precipitated polyester after the solid precipitate has been formed and used. Such breakers should be compatible with but not soluble in the water-miscible solvent and, in some embodiments, may be relatively unreactive at surface conditions.

In the various examples, the treatment fluids comprising the solubilized polyester may contact an aqueous fluid, which may be used to drive the polyester out of solution. The aqueous fluid may generally be from any source including the subterranean formation. In various examples, the aqueous fluid may comprise fresh water, acidified water, salt water, seawater, brine, or an aqueous salt solution. In some embodiments, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. In examples, the aqueous fluid should contact the treatment fluid such that at least a portion of the solubilized polyester is driven out of solution to form an amorphous polymeric structure, which may capture and carry the solid particulate. For example, the treatment fluid comprising the solubilized polyester may be streamed through the aqueous fluid as the treatment fluid is injected into a fracture. As an alternative example, the treatment fluid comprising the solubilized polyester may be mixed with a solid particulate and then mixed with an aqueous fluid prior to or immediately after injection into the wellhead.

The aqueous fluid, which may contact the solubilized polyester, may comprise an additive. For example, the aqueous fluid may comprise an acid, a scale inhibitor, a clay-stabilizing agent, a shale stabilizing agent, a viscosifier, a permeability modifier, one or more salts, or any combination thereof. Examples of acids may include, but are not limited to, hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboric acid, fluorophosphoric acid, hexafluorotitanic acid, fluorophosphoric acid, phosphoric acid, slats thereof, derivatives thereof, or any combination thereof. Examples of scale inhibitors may include, but are not limited to, tetrasodium ethylenediamine acetate, pentamethylene phosphonate, hexamethylenediamine phosphonate, polyacrylate, or any combination thereof. Examples of shale stabilizing agents may include, but are not limited to, long chain alcohols, polyols, amine inhibitors, sodium or potassium silicates, partially hydrolyzed polyacrylamides, polyalkene glycols, anionic surfactants, salt solutions containing, for example, sodium chloride, potassium chloride, or ammonium chloride; cationic polymers and oligomers, for example, poly(dimethyldiallylammonium chloride), cationic poly(acrylamide), cationic poly(diemethylaminoethylmethacrylate), or any combination thereof. Examples of viscosifiers may include, but are not limited to, mineral viscosifiers (e.g., bentonite and the like), polymeric viscosifiers, crosslinked polymeric viscosifiers, crosslinkable polymeric viscosifiers, viscoelastic surfactants, or any combination thereof. Examples of permeability modifiers may include, but are not limited to, a hydrophobically modified hydrophilic polymer. Hydrophobically modified hydrophilic polymers vary widely in structure, but generally comprise a hydrophilic polymer that has been at least partially chemically modified with hydrophobic groups (e.g., long chain alkyl groups having more than four carbon atoms). Hydrophilic polymers may include homopolymer, copolymers, terpolymers, and the like with monomeric units that include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide, acrylamide, methacrylamide, and hydroxyethyl acrylate. In some instances, other monomeric units may be included in the copolymers and terpolymers.

Figure 11:
FIG. 11 is a photograph of the injected treatment fluid forming an amorphous polymeric structure with the captured proppant.
Figure 12:
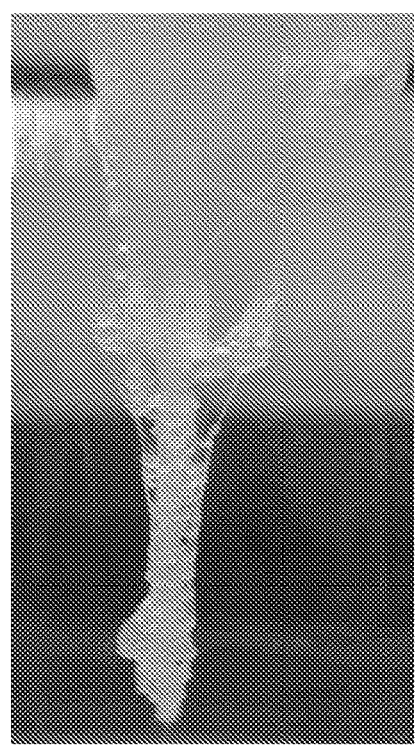
FIG. 12 is a photograph of an enlarged view of the amorphous polymeric structure with the captured proppant.
Figure 13:
FIG. 13 is a photograph of the amorphous polymeric structure with the captured proppant placed on a countertop.

As discussed above, the solubilized polyester may be precipitated when the treatment fluid contacts an aqueous fluid. The polyester may form an amorphous polymeric structure. As the polymeric structure is amorphous, it does not possess a clearly defined shape. The size and shape of the polymeric structure is dependent on the concentration of the solubilized polyester as well as the method of mixing and dispersing of the solubilized polyester in the aqueous fluid. The amorphous polymeric structure may be used to form rope-like strands, globular webbing-like structures, thin sheet-like structures, etc. Examples of the amorphous polymeric structure forming globular webbing with captured proppant are illustrated by FIGS. 11-13 discussed below. The amorphous polymeric structure may also be described as being non-particulate in nature as it may form one or more continuous structures instead of minute discrete particles of matter. Alternatively, the amorphous polymeric structure may form discrete particulates of sufficient size to capture and aggregate at least a portion of the solid particulates. As described above, the amorphous polymeric structure is able to capture the solid particulates in the treatment fluid when the polyester is driven out of solution. The amorphous polymeric structure may then carry the solid particulates into a fracture that may, in some examples, reduce the amount of solid particulates lost to other areas not selected for stimulation (e.g., rat hole, annulus, etc.). Further, due to the nature of the amorphous polymeric structure, the amorphous polymeric structure may be less susceptible to flow back as compared to loose uncaptured solid particulates. As such, the amorphous polymeric structure may remain in the desired area with the captured solid particulates, reducing the amount of solid particulates lost to flow back. As the amorphous polymeric structure captures the solid particulates, the solid particulates may be prevented from separating from the amorphous polymeric structure, and thus an individual captured solid particulate is prevented from being dispersed and separated from other individual captured solid particulates. As such, the amorphous polymeric structure may maintain the solid particulates in an aggregated state, which may allow for more efficient placement. This arrangement may allow less solid particulates to be used overall in some examples.

In some examples, the treatment fluid may be foamed to increase the buoyancy of the amorphous polymeric structure when formed. Foaming of the treatment fluid generally comprises adding a gas to the treatment fluid. When the solubilized polyester is contacted by an aqueous fluid and driven out of solution, the resulting amorphous polymeric structure may capture pockets of the gas and trap it in the amorphous polymeric structure. The captured gas may increase the buoyancy of the amorphous polymeric structure in some examples, and may increase the ability of the amorphous polymeric structure to travel in and remain in a fracture.

In examples, the treatment fluid may be foamed at the surface or downhole. The treatment fluid may be foamed by entraining gas into the treatment fluid. In some examples, a foaming additive may also be added to the treatment fluid. Examples of gas sufficient for foaming include, but are not limited to, nitrogen, carbon dioxide, air, methane, helium, argon, or any combination thereof. One skilled in the art, with the benefit of this disclosure, should understand the benefit of each gas.

The quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

The amorphous polymeric structure may be degraded over time to leave the captured aggregated solid particulates within the fracture. For example, the amorphous polymeric structure may be hydrolyzed over time. Alternatively, the amorphous polymeric structure may break down at elevated temperatures. In some instances, the amorphous polymeric structure may be at least partially chemically degraded. For example, the amorphous polymeric structure may be contacted with an inorganic base, an acid, an amine, an amino alcohol, or similar chemical degradation agent once the amorphous polymeric structure has carried and dispersed the captured aggregated solid particulates into the fracture.

Although the examples described herein refer to a "fracture," it is to be understood that the amorphous polymeric structure may carry the solid particulates into multiple fractures, for example, multiple primary or multiple dominant fractures. Further, the amorphous polymeric structure may carry the solid particulates into multiple fractures within a fracture network, for example, secondary fractures, tertiary fractures, and so on. In some examples, a fracture may comprise a constriction or constricted area that may be treated with at least some of the treatment fluids described herein. Some examples described herein may further involve producing hydrocarbons from the fracture into which the amorphous polymeric structure was placed.

In the examples, systems configured for delivering the treatment fluids and aqueous fluids described herein to a downhole location are described. The systems may comprise a pump coupled to a tubular. The pump may be a high pressure pump in some examples. As used herein, the term "high pressure pump" will refer to a pump that is capable of delivering a fluid downhole at a pressure of about 1000 psi or greater. Suitable high pressure pumps will be known to one having ordinary skill in the art and may include, but are not limited to, floating piston pumps and positive displacement pumps.

In other examples, the pump may be a low pressure pump. As used herein, the term "low pressure pump" will refer to a pump that operates at a pressure of about 1000 psi or less. In some examples, a low pressure pump may be coupled to a high pressure pump that is coupled to the tubular. That is, in such examples, the low pressure pump may be configured to convey the treatment fluid and/or the aqueous fluid to the high pressure pump. In such examples, the low pressure pump may "step up" the pressure of the treatment fluid and/or aqueous fluid before it reaches the high pressure pump. Suitable low pressure pumps will be known to one having ordinary skill in the art and may include, but are not limited to, centrifugal pumps, peristaltic pumps, and diaphragm pumps.

In some examples, the systems described herein can further comprise a mixing tank that is upstream of the pump and may comprise the components of the treatment fluid or aqueous fluid to be formulated. In various examples, the pump (e.g., a low pressure pump, a high pressure pump, or a combination thereof) may convey the treatment fluid and/or aqueous fluid from the mixing tank or other vessel to the tubular. In other examples, however, the treatment fluid and/or aqueous fluid may be formulated offsite and transported to a worksite, in which case the treatment fluid and/or aqueous fluid may be introduced to the tubular via the pump directly from its shipping container (e.g., a truck, a railcar, a barge, or the like) or from a transport pipeline. In other examples, however, the treatment fluid and/or aqueous fluid may be mixed downhole after introduction to the tubular via the pump. In this example, the mixer may be a component of the bottom-hole assembly or be located uphole of the bottom-hole assembly and may mix the treatment fluid and the aqueous fluid as desired prior to introduction into a fracture. In all examples, the treatment fluid and/or aqueous fluid may be drawn into a pump, elevated to an appropriate pressure, and then introduced into the tubular for delivery downhole.

FIG. 1 illustrates a schematic of a system to deliver the treatment fluid to a downhole location, according to one or more examples. It should be noted that while FIG. 1 generally depicts a land-based system, it is to be recognized that like systems may be operated in subsea locations as well. As depicted in FIG. 1, system, generally 1, may include mixing tank 10 in which a treatment fluid may be formulated. In all examples, the water-insoluble degradable polyester, the water-miscible solvent, the optional solid particulates, and any optional additives may be added to the mixer in any sequence, and in some examples, two or more components may be mixed prior to the addition of any other components. Pump 20 may then be used to pump the treatment fluid to wellhead 14 via line 12, where the treatment fluid may enter tubular 16. Tubular 16 may be any type of tubular or conduit for a fluid including, but not limited to, casing, liner, tubing, coiled tubing, jointed tubing, stick pipe, a combination thereof, and the like. Tubular 16 may extend from wellhead 14 into subterranean formation 18. Pump 20 may be a high pressure pump, low pressure pump, or a combination thereof. Pump 20 may be configured to raise the pressure of the treatment fluid to a desired pressure and/or rate before its introduction into tubular 16. It is to be recognized that system 1 is merely exemplary in nature, and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
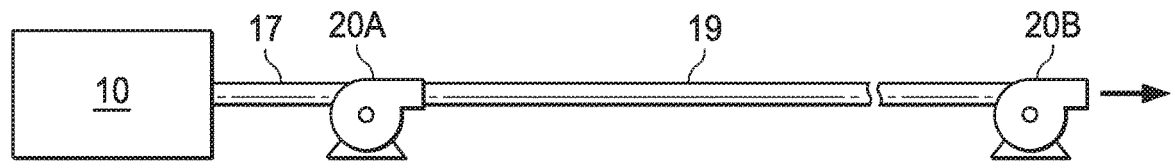
FIG. 2 illustrates a schematic of an arrangement of a mixing tank and pumps to pump a treatment fluid into a subterranean formation, according to one or more examples.

FIG. 2 illustrates a schematic of an example arrangement of a mixing tank 10 and pumps 20A and 20B to pump a treatment fluid into a subterranean formation, for example, subterranean formation 18 as illustrated in FIG. 1. In this particular example, mixing tank 10 comprises the water-insoluble degradable polyester, the water-miscible solvent, the optional solid particulates, and any other optional additives. The water-insoluble degradable polyester, the water-miscible solvent, the optional solid particulates, and any optional additives may be mixed in mixing tank 10 to form the treatment fluid. When mixed sufficiently, the polyester will be dissolved in the water-miscible solvent, and the optional solid particulates will be suspended in the treatment fluid to the desired concentration. The treatment fluid may then be conveyed to a low pressure pump 20A by line 17. The low-pressure pump 20A may then pump the treatment fluid directly into the suction of a high pressure pump 20B via line 19. The high pressure pump 20B may then pump the treatment fluid into the wellbore via a tubular and connecting line (e.g., line 12 and tubular 16 as illustrated in FIG. 1). It is to be understood that FIG. 2 illustrates merely one example of an arrangement of pumps 20 and mixing tank 10 and that many different arrangements of pumps 20 and mixing tank 10 may be used in any of the disclosed examples as will be readily apparent to one of ordinary skill in the art.

Figure 3:
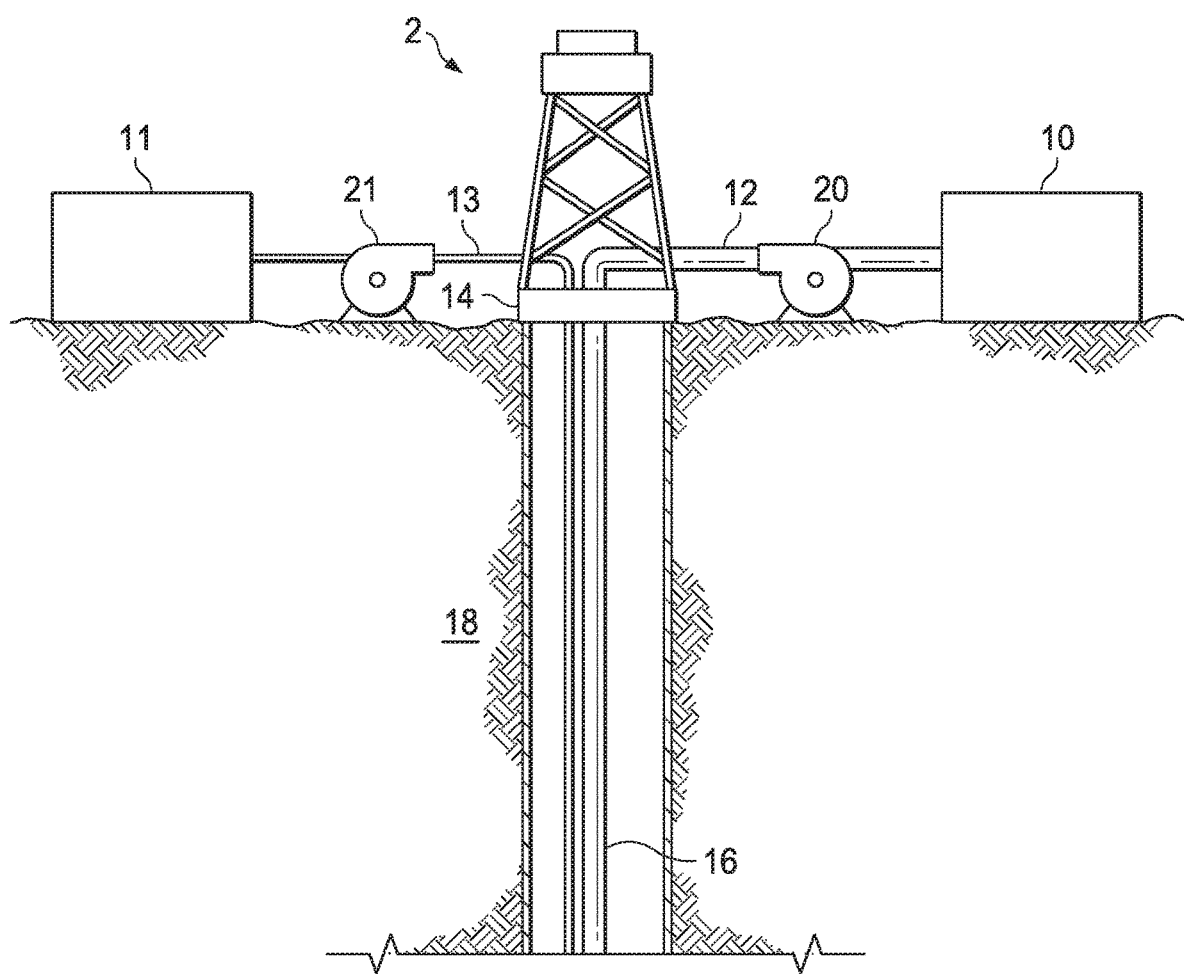
FIG. 3 illustrates a schematic of a system to deliver the treatment fluid to a downhole location, according to one or more examples.

FIG. 3 illustrates a schematic of a system to deliver the treatment fluids to a downhole location, according to one or more examples. FIG. 3 depicts a system, generally 2, comprising all of the same components as system 1 depicted in FIG. 1, with the addition of components which may be used to convey the treatment fluid in its own injection line 13. As in FIG. 1, mixing tank 10, line 12, and pump 20 are used to convey any type of fluid (e.g., aqueous fluids) into tubular 16. However, in the example of FIG. 3, a separate mixing and pumping assembly may be used to convey the treatment fluids described herein into the wellbore. Mixing tank 11 may be used to mix the treatment fluid as described above with reference to mixing tank 10. Pump 21 may then be used to pump the treatment fluid to wellhead 14 via line 13. Mixing tank 11 may be the same or a different type of mixing tank as mixing tank 10. Pump 21 may be the same or a different type of pump or pumps as pump 20. Line 13 may be the same or a different type of line as line 12. Line 13 may be coupled to tubular 16. Although line 13 is depicted as coupling to the exterior of tubular 16, line 13 may also be run on the interior of tubular 16. Line 13 may exit just above the fracture and may be used to introduce the treatment fluid to the fracture. Upon exiting line 13 solubilized polyester may be streamed through an aqueous fluid present in the wellbore annulus where the polyester may be driven out of solution and may capture the solid particulates and carry them into the fracture.

Figure 4:
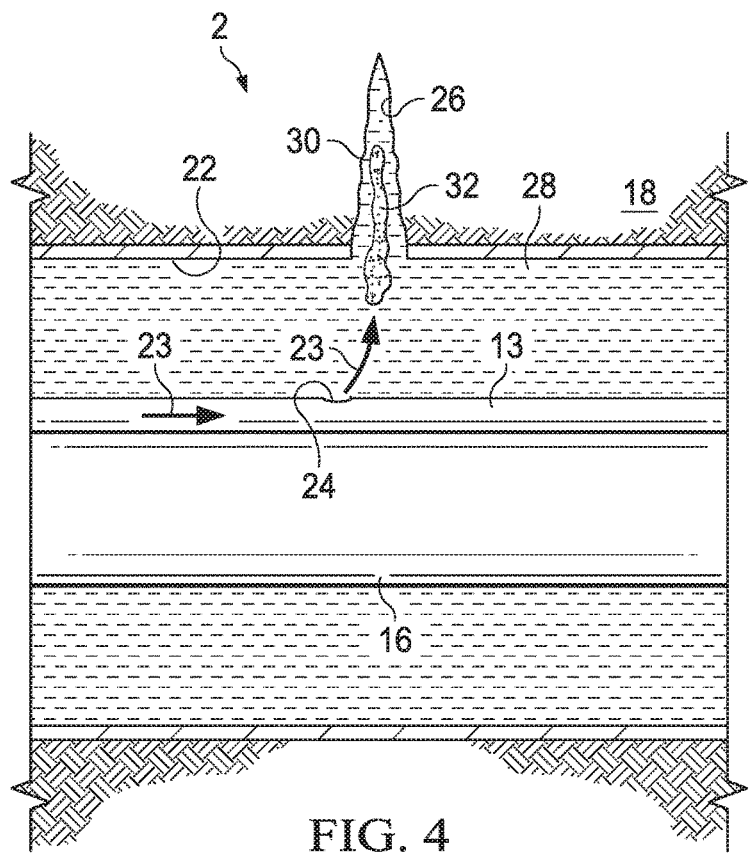
FIG. 4 illustrates a schematic of the downhole portion of the example system illustrated in FIG. 3, according to one or more examples.

FIG. 4 illustrates a schematic of the downhole portion of the example system 2 described in FIG. 3, according to one or more examples. In the example of FIG. 4, the treatment fluid comprising the solubilized polyester, water-miscible solvent, and solid particulate is disposed in line 13 which is coupled to tubular 16. The treatment fluid is pumped in the direction indicated by arrows 23. The treatment fluid may be injected into annulus 22 through perforations 24 within the wall of line 13 and which are adjacent to fracture 26. Annulus 22 may be a wellbore annulus or an annulus between concentric tubular 16. Within annulus 22 is disposed an aqueous fluid 28 as described herein. As the treatment fluid is injected through perforations 24 into annulus 22, the solubilized polyester within the treatment fluid is driven out of solution to form an amorphous polymeric structure 30 with captured solid particulates 32 disposed therein. The amorphous polymeric structure 30 may then enter the fracture 26 with the captured solid particulates 32 to perform the desired operation. As described above, the amorphous polymeric structure 30 may degrade over time, and the captured solid particulates 32 may remain in fracture 26.

System 2, as described in FIGS. 3 and 4, comprises a separate injection line 13 used solely for the treatment fluid described herein. As such, there is no risk of premature precipitation of the solubilized polyester in the line 13 so long as aqueous fluids are never present in the line 13, or the line 13 is sufficiently cleaned and flushed with solvent before use.

Figure 5:
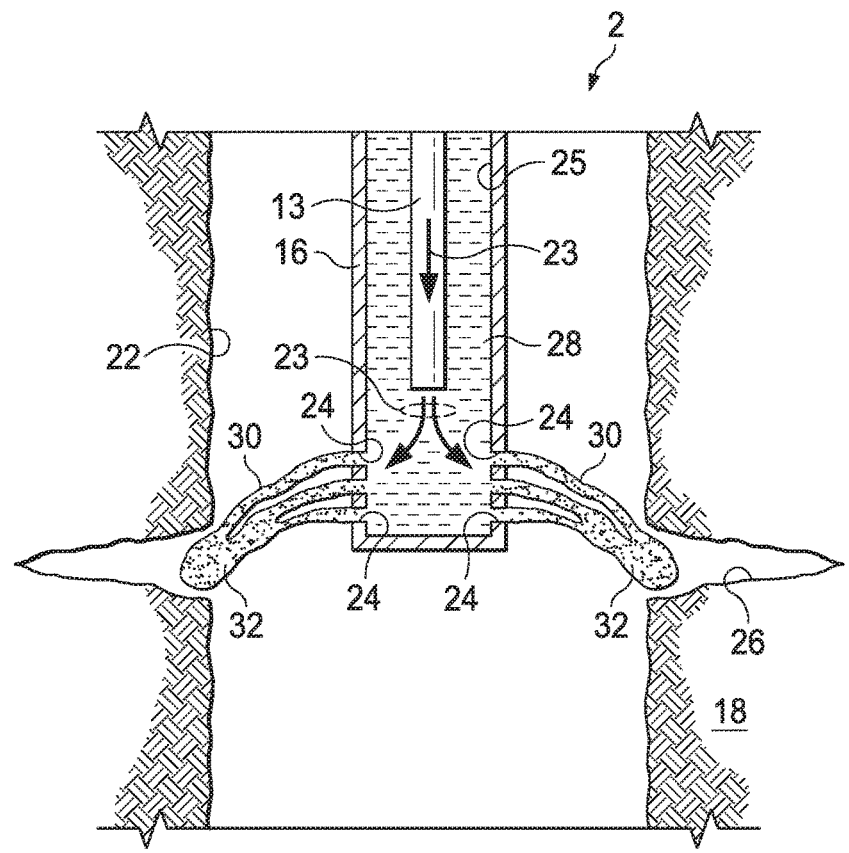
FIG. 5 illustrates an alternative schematic of the downhole portion of the example system illustrated in FIG. 3, according to one or more examples.

FIG. 5 illustrates a downhole schematic of an alternative example of system 2 described in FIG. 3, according to one or more examples. In the example of FIG. 5, line 13 is disposed within tubular 16. The treatment fluid comprising the solubilized polyester, water-miscible solvent, and solid particulate is pumped in line 13 which is disposed within tubular 16. The treatment fluid is pumped in the direction indicated by arrows 23. The treatment fluid contacts an aqueous fluid 28 disposed within tubular annulus 25 where it may be driven out of solution. The precipitated amorphous polymeric structure 30 captures the solid particulates 32 and flows through perforations 24 into wellbore annulus 22 which is adjacent to fracture 26. The amorphous polymeric structure 30 may then enter the fracture 26 with the captured solid particulates 32 to perform the desired operation. As described above, the amorphous polymeric structure 30 may degrade over time, and the captured solid particulates 32 may remain in fracture 26.

Figure 6:
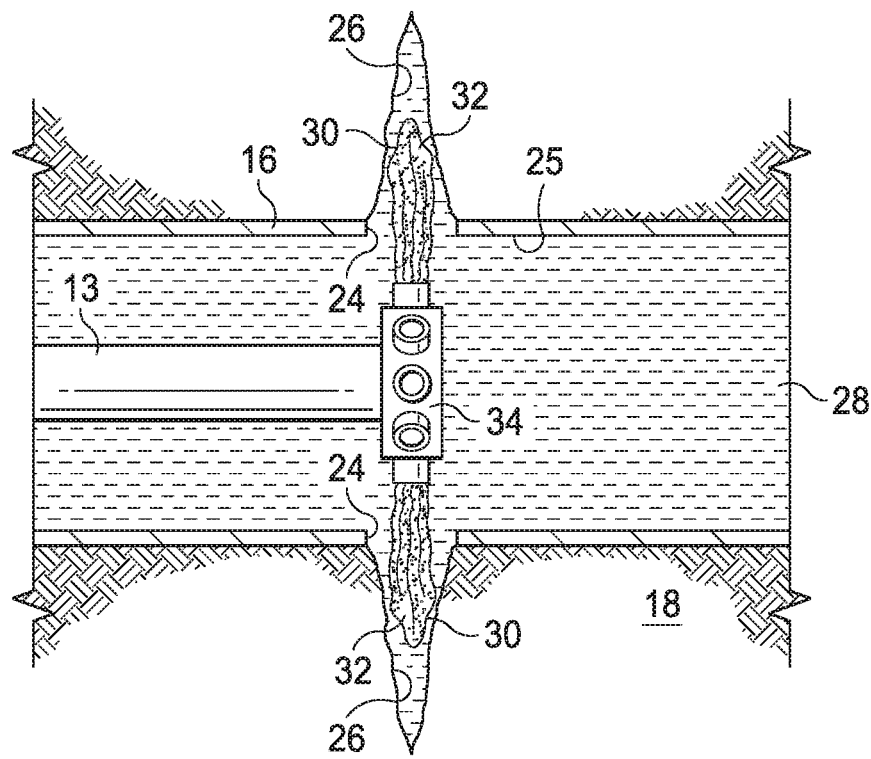
FIG. 6 illustrates an alternative schematic of the downhole portion of the example system illustrated in FIG. 5, according to one or more examples.

FIG. 6 illustrates a downhole schematic of an alternative example of system 2 as described in FIG. 5 to inject the treatment fluids into a fracture within a subterranean formation. In the example of FIG. 6, at the end of line 13, or alternatively at the bottom-hole assembly, a dispersal tool 34 may be used to mix and disperse the treatment fluid into the aqueous fluid 28. Examples of the dispersal tool 34 may include, but are not limited to, any type of downhole mixer, static jetting tool, dynamic jetting tool, dynamic mixer, and static mixer or a combination thereof. The dispersal tool 34 may be used to disperse the treatment fluid into the fracture 26 within the formation. In some examples, the dispersal tool may oscillate and pulse the treatment fluid into the aqueous fluid 28 to precipitate the polyester and form varied shapes and sizes of the amorphous polymeric structure 30. For example, the orientation, number, and size of the ports on the dispersal tool 34 may be altered to increase or decrease the surface area of the treatment fluid as it is ejected through the ports. This may allow for the size of the pieces of the amorphous polymeric structure 30 to be altered and controlled as desired. For example, smaller-sized pieces of the amorphous polymeric structure 30 may allow for the amorphous polymeric structure 30 to enter into microfractures within fracture 26 or a surrounding fracture network. The dispersal tool 34 may be altered and configured as desired to provide an amorphous polymeric structure 30 of a desired size and generalized shape. For example, the dispersal tool 34 may be used to produce an amorphous polymeric structure 30 comprising rope-like strands, globular webbing-like structures, globular particulates, thin ribbon-like sheets, etc. The dispersal tool 34 may also be capable of pulsing and oscillating the treatment fluid as it is ejected so as to vary the amount of treatment fluid which contacts the aqueous fluid 28 at a time. This adaptability allows the dispersal tool 34 to control the size of the amorphous polymeric structure 30 formed as well as the general shape. With the benefit of this disclosure, one of ordinary skill in the art will be readily able to generate an amorphous polymeric structure 30 of a desired size and generalized shape in the wellbore or fracture.

Figure 7:
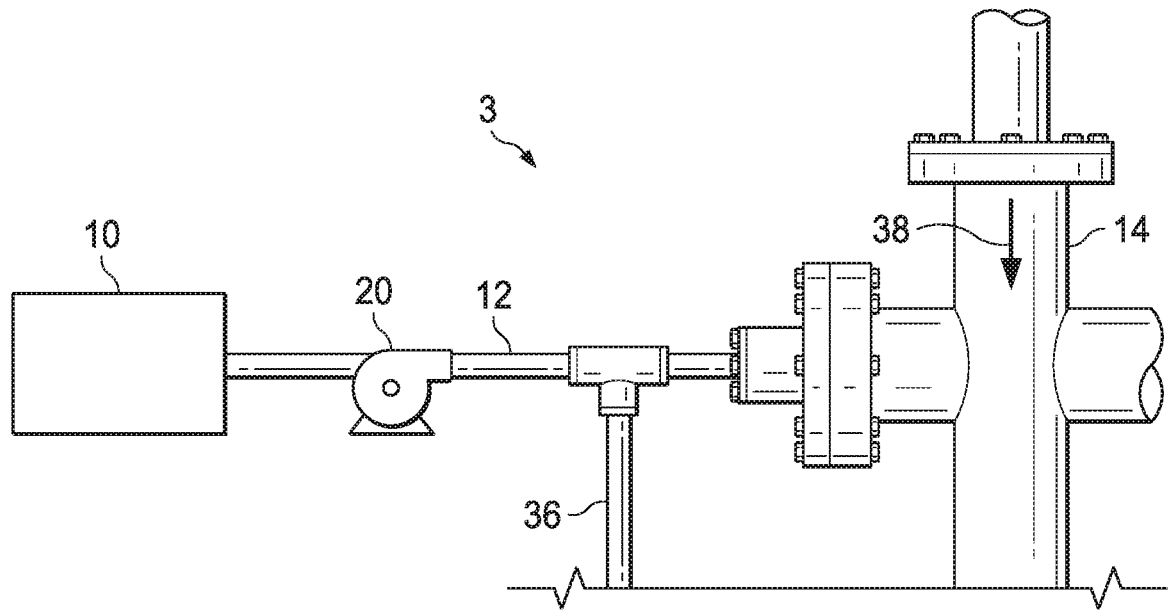
FIG. 7 illustrates a schematic of a system to precipitate the polyester out of solution at the wellhead or in a mixing unit coupled to the wellhead, according to one or more examples.

FIG. 7 illustrates a schematic of a system, generally 3, to precipitate the polyester out of solution at the wellhead 14 or in a mixing tank 10 coupled to the wellhead 14, according to one or more examples. As depicted in FIG. 7, system 3 includes mixing tank 10, in which a treatment fluid may be formulated. In one particular example, mixing tank 10 mixes the treatment fluid and an aqueous fluid together to drive the polyester out of solution before the treatment fluid is pumped to the wellhead 14. The treatment fluid may be prepared in the mixing tank 10 prior to addition of the aqueous fluid. Alternatively, the treatment fluid may be prepared separately or offsite and then added to the mixing tank 10 to mix with the aqueous fluid. The amorphous polymeric structure and the captured solid particulates (e.g., amorphous polymeric structure 30 and the captured solid particulates 32 as illustrated in FIGS. 4-6) may then be conveyed to wellhead 14 and then introduced into the wellbore. In this example, line 36 may be used to apply the water-miscible solvent as a spacer used intermittently to pulse the amorphous polymeric structure and the captured solid particulates through line 12 and reduce the risk of the amorphous polymeric structure and the captured solid particulates blocking line 12 or forming a blockage in the wellhead 14. In an alternative example of the system 3, the treatment fluid may be prepared in mixing tank 10 and then pumped to wellhead 14 via line 12 and pump 20 where the treatment fluid may be contacted by the flow stream as illustrated by arrow 38. The flow stream may drive the polyester out of solution and form the amorphous polymeric structure at the wellhead 14 where it may then be introduced into the wellbore. As with the previous example, line 36 may be used to apply the water-miscible solvent as a spacer used intermittently to pulse the treatment fluid as it is introduced into the wellhead.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-7.

EXAMPLES

The present disclosure can be better understood by reference to the following examples which are offered by way of illustration. The present disclosure is not limited to the examples given herein.

Example 1

Figure 8:
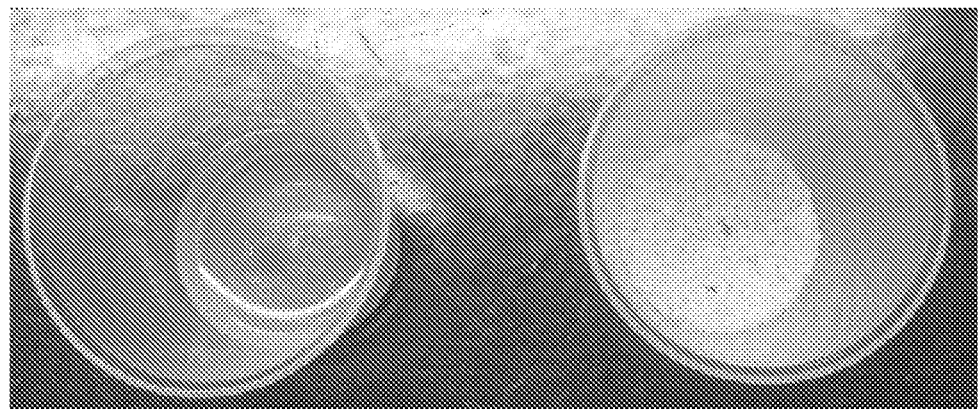
FIG. 8 is a photograph of a solubilized polyester and a proppant.
Figure 9:
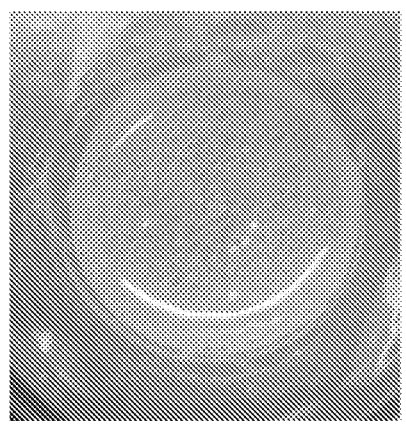
FIG. 9 is a photograph of a treatment fluid as described herein.
Figure 10:
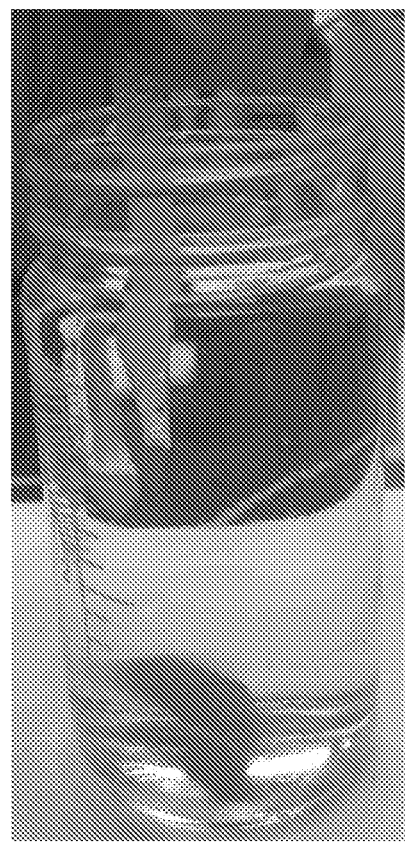
FIG. 10 is a photograph of a treatment fluid to be injected into an aqueous fluid.

One gram of polylactic acid, a polyester as described above, was added to ten milliliters of acetonitrile, a water-miscible solvent as described above, and mixed until a homogenous solution was formed. This homogenous solution is illustrated in the left vessel of FIG. 8. Five grams of coarse sand, a coarse-sized proppant and a solid particulate as described above, was provided and is illustrated by the right vessel of FIG. 8. The coarse sand was added to the solution at a 1% w/v concentration and mixed until the sand was sufficiently suspended to form a treatment fluid as illustrated by FIG. 9. FIG. 10 illustrates the treatment fluid in process of being injected into an aqueous fluid with a pipette. FIG. 11 illustrates the injected treatment fluid forming an amorphous polymeric structure with the captured sand. FIG. 11 also illustrates that there was no detectable amount of sand particles which were not captured by the amorphous polymeric structure as there was no visible amount of sand which settled at the bottom of the vessel. FIG. 12 is an enlarged view of the amorphous polymeric structure with the captured sand. FIG. 13 is a view of the amorphous polymeric structure with the captured sand removed from the vessel and placed on a countertop. FIG. 13 illustrates the amorphous nature of the precipitated polyester and also how the proppant is captured and aggregated by the polyester as it is driven out of solution by contact with the aqueous fluid.

Provided are methods for treating a fracture in accordance with the disclosure and the illustrated FIGURES. An example method comprises providing a treatment fluid comprising a solubilized polyester and a water-miscible solvent; dispersing the treatment fluid into an aqueous fluid; wherein the dispersing the treatment fluid into an aqueous fluid precipitates the solubilized polyester and forms an amorphous polymeric structure comprising the solid polyester; introducing the amorphous polymeric structure into a fracture within a subterranean formation; and allowing the amorphous polymeric structure to degrade. The treatment fluid may further comprise a solid particulate selected from the group consisting of diverting agents, proppant, solid acids, breakers, scale inhibitors, chelants, and any combinations thereof. The precipitation of the solubilized polyester may capture the solid particulate in the amorphous polymeric structure. A dispersal tool may be used to disperse the treatment fluid into the aqueous fluid. The dispersal tool may be selected from the group consisting of a downhole mixer, a dynamic jetting tool, a static jetting tool, a dynamic mixer, and a static mixer. The dispersal tool may pulse the treatment fluid as the treatment fluid is dispersed into the aqueous fluid. The polyester may be selected from the group consisting of poly(lactide), poly(glycolide), poly(e-caprolactone), poly(hydroxybutyrate), poly(orthoester), poly(terphalates) a copolymer thereof, a derivative thereof, and any combinations thereof. The water-miscible solvent may be selected from the group consisting of acetonitrile, dimethylformamide, methyl ethyl ketone, tetrahydrofuran, pyridine, N-methyl-2-pyrrolidone, dimethyl sulfoxide, butyrolactone, acetic acid, formic acid, ethyl acetate, acetone, glycol, glycerol, dioxane, dichloromethane, methanol, diethyl ether, benzene, toluene, trifluoroacetic acid, hexafluoro-2-propanol, chloroform, carbon tetrachloride, pentane, hexane, heptane, octane, halogenated derivatives thereof, alkylated derivatives thereof, isomers thereof, and any combinations thereof.

Provided are systems for treating a fracture in accordance with the disclosure and the illustrated FIGURES. An example system comprises a treatment fluid comprising a solubilized polyester and a water-miscible solvent; a mixing tank capable of mixing the solubilized polyester and the water-miscible solvent; a tubular; an injection line capable of containing the treatment fluid; an aqueous fluid positioned proximate to the tubular; and a pump capable of pumping the treatment fluid into and through the injection line. The treatment fluid may further comprise a solid particulate selected from the group consisting of diverting agents, proppant, solid acids, breakers, scale inhibitors, chelants, and combinations thereof. The mixing tank may be capable of mixing the solubilized polyester, water-miscible solvent, and the solid particulate. The injection line may be coupled to the exterior of the tubular. The injection line may be positioned in the interior of the tubular. The injection line may comprise a dispersal tool. The dispersal tool may be selected from the group consisting of a downhole mixer, a dynamic jetting tool, a static jetting tool, a dynamic mixer, and a static mixer. The dispersal tool may pulse the treatment fluid as the treatment fluid is dispersed into the aqueous fluid. The polyester may be selected from the group consisting of poly(lactide), poly(glycolide), poly(e-caprolactone), poly(hydroxybutyrate), poly(orthoester), poly(terphalates) a copolymer thereof, a derivative thereof, and any combination thereof. The water-miscible solvent may be selected from the group consisting of acetonitrile, dimethylformamide, methyl ethyl ketone, tetrahydrofuran, pyridine, N-methyl-2-pyrrolidone, dimethyl sulfoxide, butyrolactone, acetic acid, formic acid, ethyl acetate, acetone, glycol, glycerol, dioxane, dichloromethane, methanol, diethyl ether, benzene, toluene, trifluoroacetic acid, hexafluoro-2-propanol, chloroform, carbon tetrachloride, pentane, hexane, heptane, octane, halogenated derivatives thereof, alkylated derivatives thereof, isomers thereof, and any combinations thereof.

An alternative example system for treating a fracture comprises a treatment fluid comprising a solubilized polyester and a water-miscible solvent; a mixing tank capable of mixing the solubilized polyester and the water-miscible solvent; a wellhead; a pump; a first line coupled to the pump and the wellhead; and a second line coupled to the first line and configured to intermittently inject the water-miscible solvent into the first line. The treatment fluid may further comprise a solid particulate selected from the group consisting of diverting agents, proppant, solid acids, breakers, scale inhibitors, chelants, and combinations thereof. The mixing tank may be capable of mixing the solubilized polyester, water-miscible solvent, and the solid particulate. The system may further comprise an aqueous fluid. The mixing tank may be capable of mixing the treatment fluid and the aqueous fluid. The system may further comprise an aqueous fluid disposed within the wellhead. The first line may be configured to inject the treatment fluid into the wellhead to contact the aqueous fluid. The polyester may be selected from the group consisting of poly(lactide), poly (glycolide), poly(e-caprolactone), poly(hydroxybutyrate), poly(orthoester), poly(terphalates) a copolymer thereof, a derivative thereof, and any combination thereof. The water-miscible solvent may be selected from the group consisting of acetonitrile, dimethylformamide, methyl ethyl ketone, tetrahydrofuran, pyridine, N-methyl-2-pyrrolidone, dimethyl sulfoxide, butyrolactone, acetic acid, formic acid, ethyl acetate, acetone, glycol, glycerol, dioxane, dichloromethane, methanol, diethyl ether, benzene, toluene, trifluoroacetic acid, hexafluoro-2-propanol, chloroform, carbon tetrachloride, pentane, hexane, heptane, octane, halogenated derivatives thereof, alkylated derivatives thereof, isomers thereof, and any combinations thereof.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of treating a fracture:
   providing a treatment fluid comprising a solubilized polyester and a water-miscible solvent;
   dispersing the treatment fluid into an aqueous fluid; wherein the dispersing the treatment fluid into an aqueous fluid precipitates the solubilized polyester and forms an amorphous polymeric structure comprising a solid polyester;
   introducing the amorphous polymeric structure into a fracture within a subterranean formation; and
   allowing the amorphous polymeric structure to degrade.

2. The method of claim 1, wherein the treatment fluid further comprises a solid particulate selected from the group consisting of diverting agents, proppant, solid acids, breakers, scale inhibitors, chelants, and any combinations thereof; and wherein precipitation of the solubilized polyester captures the solid particulate in the amorphous polymeric structure.

3. The method of claim 1, wherein a dispersal tool is used to disperse the treatment fluid into the aqueous fluid, wherein the dispersal tool is selected from the group consisting of a downhole mixer, a dynamic jetting tool, a static jetting tool, a dynamic mixer, and a static mixer.

4. The method of claim 3, wherein the dispersal tool pulses the treatment fluid as the treatment fluid is dispersed into the aqueous fluid.

5. The method of claim 1, wherein the solubilized polyester is selected from the group consisting of poly(lactide), poly(glycolide), poly(e-caprolactone), poly(hydroxybutyrate), poly(orthoester), poly(terphalates) a copolymer thereof, a derivative thereof, and any combinations thereof.

6. The method of claim 1, wherein the water-miscible solvent is selected from the group consisting of acetonitrile, dimethylformamide, methyl ethyl ketone, tetrahydrofuran, pyridine, N-methyl-2-pyrrolidone, dimethyl sulfoxide, butyrolactone, acetic acid, formic acid, ethyl acetate, acetone, glycol, glycerol, dioxane, dichloromethane, methanol, diethyl ether, benzene, toluene, trifluoroacetic acid, hexafluoro-2-propanol, chloroform, carbon tetrachloride, pentane, hexane, heptane, octane, halogenated derivatives thereof, alkylated derivatives thereof, isomers thereof, and any combinations thereof.

7. A system for treating a fracture:
   a treatment fluid comprising a solubilized polyester and a water-miscible solvent;
   a mixing tank capable of mixing the solubilized polyester and the water-miscible solvent;
   a tubular;
   an injection line capable of containing the treatment fluid;
   an aqueous fluid positioned proximate to the tubular;
   a pump capable of pumping the treatment fluid into and through the injection line; and
   an amorphous polymeric structure formed from the contact of the mixed solubilized polyester and the water-miscible solvent with the aqueous fluid.

8. The system of claim 7, wherein the treatment fluid further comprises a solid particulate selected from the group consisting of diverting agents, proppant, solid acids, breakers, scale inhibitors, chelants, and combinations thereof; and wherein the mixing tank is capable of mixing the solubilized polyester, water-miscible solvent, and the solid particulate.

9. The system of claim 7, wherein the injection line is coupled to the exterior of the tubular.

10. The system of claim 7, wherein the injection line is positioned in the interior of the tubular.

11. The system of claim 7, wherein the injection line comprises a dispersal tool.

12. The system of claim 11, wherein the dispersal tool is selected from the group consisting of a downhole mixer, a dynamic jetting tool, a static jetting tool, a dynamic mixer, and a static mixer.

13. The system of claim 11, wherein the dispersal tool pulses the treatment fluid as the treatment fluid is dispersed into the aqueous fluid.

14. The system of claim 7, wherein the solubilized polyester is selected from the group consisting of poly(lactide), poly(glycolide), poly(e-caprolactone), poly(hydroxybutyrate), poly(orthoester), poly(terphalates) a copolymer thereof, a derivative thereof, and any combination thereof.

15. The system of claim 7, wherein the water-miscible solvent is selected from the group consisting of acetonitrile, dimethylformamide, methyl ethyl ketone, tetrahydrofuran, pyridine, N-methyl-2-pyrrolidone, dimethyl sulfoxide, butyrolactone, acetic acid, formic acid, ethyl acetate, acetone, glycol, glycerol, dioxane, dichloromethane, methanol, diethyl ether, benzene, toluene, trifluoroacetic acid, hexafluoro-2-propanol, chloroform, carbon tetrachloride, pentane, hexane, heptane, octane, halogenated derivatives thereof, alkylated derivatives thereof, isomers thereof, and any combinations thereof.

16. A system for treating a fracture:
   a treatment fluid comprising a solubilized polyester and a water-miscible solvent;

a mixing tank capable of mixing the solubilized polyester and the water-miscible solvent;

a wellhead;

a pump;

a first line coupled to the pump and the wellhead; and a second line coupled to the first line and configured to intermittently inject the water-miscible solvent into the first line; and an amorphous polymeric structure formed from the contact of the mixed solubilized polyester and the water-miscible solvent with an aqueous fluid.

17. The system of claim 16, wherein the treatment fluid further comprises a solid particulate selected from the group consisting of diverting agents, proppant, solid acids, breakers, scale inhibitors, chelants, and combinations thereof; and wherein the mixing tank is capable of mixing the solubilized polyester, water-miscible solvent, and the solid particulate.

18. The system of claim 16, further comprising an aqueous fluid; and wherein the mixing tank is capable of mixing the treatment fluid and the aqueous fluid.

19. The system of claim 16, wherein an aqueous fluid is disposed within the wellhead; wherein the first line is configured to inject the treatment fluid into the wellhead to contact the aqueous fluid.

20. The system of claim 16, wherein the solubilized polyester is selected from the group consisting of poly(lactide), poly(glycolide), poly(e-caprolactone), poly(hydroxybutyrate), poly(orthoester), poly(terphalates) a copolymer thereof, a derivative thereof, and any combinations thereof.

* * * * *